(12) United States Patent
Hamme (10) Patent No.: US 12,049,389 B2
(45) Date of Patent: Jul. 30, 2024

(54) METHOD AND SYSTEM FOR RECOGNISING THE SETUP STATE OF A CRANE

(71) Applicant: Liebherr-Werk Ehingen GmbH, Ehingen/Donau (DE)

(72) Inventor: Ulrich Hamme, Ehingen (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 108 days.

(21) Appl. No.: 17/416,446

(22) PCT Filed: Dec. 18, 2020

(86) PCT No.: PCT/EP2020/087321
§ 371 (c)(1),
(2) Date: Jun. 18, 2021

(87) PCT Pub. No.: WO2021/123381
PCT Pub. Date: Jun. 24, 2021

(65) Prior Publication Data
US 2022/0324680 A1    Oct. 13, 2022

(30) Foreign Application Priority Data
Dec. 20, 2019   (DE) ..................... 10 2019 135 444.7

(51) Int. Cl.
*B66C 13/46*     (2006.01)
*B66C 15/00*     (2006.01)
(Continued)

(52) U.S. Cl.
CPC .............. *B66C 13/46* (2013.01); *B66C 15/00* (2013.01); *B66C 23/283* (2013.01); *G06T 7/70* (2017.01); *B66C 2700/08* (2013.01)

(58) Field of Classification Search
CPC ....... B66C 13/46; B66C 15/00; B66C 23/283; B66C 2700/08; G06T 7/70
(Continued)

(56) References Cited

U.S. PATENT DOCUMENTS

2015/0285616 A1*  10/2015  Jordil ...................... H04N 7/18
                                                            33/503
2018/0101956 A1*  4/2018   Elkins ...................... G06T 7/74

FOREIGN PATENT DOCUMENTS

DE     202004008083 U1    11/2005
DE     102012025111 A1    6/2014
(Continued)

*Primary Examiner* — Jerome Grant, II
(74) *Attorney, Agent, or Firm* — McCoy Russell LLP (57) ABSTRACT

The invention relates to a method for recognising a setup state of a crane in which a crane setup state input manually into the crane controller is compared with the actual current setup state, comprising the steps of determining the target position of at least one target crane element installed on the crane on the basis of a crane setup state stored in the crane controller and at least one crane sensor value, transmitting the one or more pieces of target position data to a mobile flying device, moving the flying device into a region in the immediate vicinity of the target position of the target crane element and detecting and identifying a current crane element located there using a detection means, and identifying the current crane element detected in the detection region and establishing whether the detected crane element corresponds to the target crane element.

14 Claims, 5 Drawing Sheets

(51) Int. Cl.
    *B66C 23/28*   (2006.01)
    *G06T 7/70*    (2017.01)
(58) Field of Classification Search
    USPC .......................................... 705/32; 382/103
    See application file for complete search history.

(56)            References Cited

FOREIGN PATENT DOCUMENTS

| DE | 102013008348 A1 |   | 11/2014 |                |
|----|-----------------|---|---------|----------------|
| DE | 102015016856 A1 |   | 6/2017  |                |
| DE | 202017104706 U1 |   | 9/2017  |                |
| DE | 102019101623    | * | 7/2020  | ............. B66C 21/04 |
| JP | 2019060780      | * | 12/2019 | ......... G01N 21/8851 |
| TW | 201536493       | * | 9/2017  | ............ B25J 9/1679 |
| WO | 2017162336 A1   |   | 9/2017  |                |
| WO | 2018134987 A1   |   | 7/2018  |                |
| WO | WO2019158171    | * | 8/2019  | ............... G05D 1/10 |

\* cited by examiner

| # | Label |
|---|---|
| 1 | S articulation part 11 |
| 2 | Lattice part 12m - S 3531.50 |
| 3 | Lattice part 12m - S 3531.45 |
| 4 | Lattice part 6m - S 3531.36 |
| 5 | Lattice part 12m - S 3531.36 |
| 6 | Lattice part 12m - S 3531.25 |
| 7 | Lattice part 12m - S 3531.45/36 |
| 8 | S head part |
| 9 | W articulation part |
| 10 | Luffer reducing part 6m |
| 11 | Lattice part 6m - LI 2824.36 |
| 12 | Lattice part 12m - LI 2824.36 |
| 13 | Lattice part 12m - LI 2824.25Z |
| 14 | Lattice part 12m - LI 2824.26 |
| 15 | W head part |
| 16 | Derrick articulation part |
| 17 | Lattice part 12m - D 2824.36 |
| 18 | Lattice part 6m - D 2824.36A |
| 19 | Lattice part 12m - D 2824.25 |
| 20 | Derrick head part |
| 21 | Lattice part 6m - D 2824.36A |
| 22 | P adapter 6m bottom |
| 23 | P adapter 6m top |
| 24 | WA frame 1 bottom |
| 25 | WA frame 1 intermediate part |
| 26 | WA frame 1 head part |
| 27 | WA frame 2 bottom |
| 28 | WA frame 2 intermediate part |
| 29 | WA frame 2 head part |
| 30 | Mast projection |
| 31 | Auxiliary jib adapter |
| 32 | Auxiliary jib |
| 33 | Fly jib adapter |
| 34 | Fly jib intermediate part |
| 35 | Fly jib |

METHOD AND SYSTEM FOR RECOGNISING THE SETUP STATE OF A CRANE

CROSS REFERENCE TO RELATED APPLICATIONS

The present application is a U.S. National Phase of International Application No. PCT/EP2020/087321 entitled "VERFAHREN UND SYSTEM ZUR RÜSTZUSTANDSERKENNUNG EINES KRANS," and filed on Dec. 18, 2020. International Application No. PCT/EP2020/087321 claims priority to German Patent Application No. 10 2019 135 444.7 filed on Dec. 20, 2019. The entire contents of each of the above-listed applications are hereby incorporated by reference for all purposes.

TECHNICAL FIELD

The invention relates to a method for recognising a setup state of a crane in which a crane setup state input manually into the crane controller is compared with the actual setup state.

BACKGROUND AND SUMMARY

Cranes which can be assembled from a plurality of individual components are known from the prior art. These include certain types of mobile cranes or rotating tower cranes, for example. In this case, there are often multiple combining options of the various crane components for assembly, with the manufacturer typically not having approved all of these equipment variants for safe operation. As a result, in particular when using similar components, it is possible for this to result in incorrect or improper assembly.

Once the setup has been completed by assembling the individual crane elements, the crane operator has to accordingly configure the crane controller. This in particular includes manually inputting the setup state of the crane into the crane controller. The crane operator also has to name the installed crane elements and specify their positions. The crane controller operates on the basis of the input setup state, in particular a load restriction, during operation.

For the above reasons, however, it is possible for entries to be incorrect and therefore for the programming of the crane controller to be incorrect. There is therefore the need for additional safety precautions in order to verify the manual setup state input.

This object is achieved by determining the target position of at least one target crane element installed on the crane on the basis of a crane setup state stored in the crane controller and at least one crane sensor value, transmitting the one or more pieces of target position data to a mobile flying device, moving the flying device into a region in the immediate vicinity of the target position of the target crane element and detecting and identifying a current crane element located there using a detection means, and identifying the current crane element detected in the detection region and establishing whether the detected crane element corresponds to the target crane element.

The core concept of the invention is the use of a mobile flying device in order to identify the actual current setup state of the crane and to verify the manually input setup state of the crane on the basis of this information. In order to implement this approach largely autonomously as far as possible, the expected target position of at least one target crane element installed on the crane is first determined on the basis of the crane setup state stored in the crane controller and one or more sensor values from the crane sensors. This is preferably carried out for the majority of the installed components or for all of the installed components. This in particular concerns boom parts and lattice parts for a tower or boom system including boom extensions. This also includes any articulation parts, head parts, intermediate parts, elements of a derrick boom, adapters for parallel tower elements, as wells as elements of the bracing, i.e. guy rods, guy blocks, cabling, etc. Ballast elements also come under the broader term "crane elements". Generally, a crane component can be any component which can be varied when setting up the crane and has to be input in the crane controller in the context of the manual input of the setup state.

The current position of the target crane element is intended to be determined by means of the at least one sensor value. Luffing angles, rotational angles and other values that allow conclusions to be drawn on the current position and orientation of the crane and/or the crane elements to be checked are detected, for example. These conclusions can also be drawn on the basis of a system consisting of a camera and associated markers, with the markers being arranged on a crane element, for example.

The determined target position of at least one target crane element is preferably determined in relation to a crane-related coordinate system. In this case, the crane-related coordinate system may be linked to an additional coordinate system, in particular a coordinate system which is used by the mobile flying device for positioning. A link to the geographical coordinate system is preferred here.

In another step, the target position data are transmitted to a mobile flying device. The flying device then moves into a region in the immediate vicinity of the provided target position of a selected target crane element. By means of a detection means installed on the flying device, a current crane element located there is then detected and simultaneously identified after accordingly orienting the flying device. The identified current crane element can subsequently be compared with the target crane element. If these conform, the manual input of the crane setup state is verified, and otherwise there is an error. The process of flying to a target position and of detecting, identifying and establishing is preferably performed in succession for all the provided target positions of the target crane elements.

By means of the method according to the invention, a check can thus be carried out for each individual crane element as to whether it conforms with the input setup state. A particular advantage of the method is that a mobile flying device, for example a drone, is used for checking the current crane element and its conformity with the target crane element, such that a check can be performed on the crane in the fully setup state. In particular, the verification can also be performed with the boom system upright and the stays tensioned. Since the flying device mainly stays at a great height in the region of the upright boom system, any risk to bystanders or objects is minimised.

An integrated camera of the drone or flying device can be used as a detection means, for example.

A detected crane element can be identified in different ways. For example, there is the option of visual image evaluation here. The whole process is made easier if individual crane elements are equipped with separate identification means which simplify automatic detection and identification and make it more reliable. This is achieved for example by dedicated codes, for example barcodes, which are applied to the crane elements. It is also conceivable to attach sheet-metal signs. Alternatively, it is equally possible to equip the crane elements with suitable transponders, which (e.g. inductively) transmit data to an appropriate reader of the flying object for the information exchange.

When using identification features of this kind, it is also helpful for the relative position of the identification feature for the crane element to additionally be taken into account when determining the target position. This is necessary in particular for crane elements having large dimensions. The target position transmitted to the flying device therefore takes into account the position of the identification feature or corresponds to the position of the identification means, which ensures that it is possible to detect the identification feature from the actuated target position of the flying device without any difficulty. In addition, geometric data for the crane element may also be taken into account in the target positioning in order to ensure that the flying device can also actually actuate the calculated target position.

Furthermore, there is the option of bringing the crane into a predefined state or position before determining the target position of the individual target crane elements. It is possible to select a state with the boom system raised. By selecting an optimal crane position, the detection and identification can be simplified. In addition, the flying area of the flying device can be moved to an area outside an area that is possibly hazardous to persons or objects involved. The risk of incorrectly detecting and identifying crane components that are mounted in the crane surroundings and are not being used is also minimized. The method does not have to be performed in one specific crane position, however.

As already explained above, the target position data can be defined in a crane-related coordinate system. It is likewise conceivable here to link the crane-related coordinate system to an additional coordinate system, for example using geographical coordinates, which can be ascertained by means of an integrated GPS system of the flying device. Known drones generally have an integrated GPS system for positioning. Against this background, it is useful to transform the crane-related coordinates of the target positions into corresponding GPS coordinates.

For performing the method, it is unimportant which method steps are specifically performed on which units or devices. It is conceivable for both the positioning and the subsequent evaluation and establishing to be performed on the crane controller by comparing the current and target crane elements. A bidirectional communication connection between the flying device and the crane controller is required to do this. It is likewise conceivable for the determination of the target position data to be performed on the crane controller, but for the subsequent steps to be processed by the internal logic of the flying device. It is also conceivable for an external computing system, for example a system in the cloud, to be incorporated for performing one or more of the above-mentioned method steps. To do this, bidirectional communication both with the crane controller and with the flying device is required.

Depending on the construction site, it may be necessary to restrict the flying area of the flying device to a defined flying area. This may for example be applicable to a construction site with limited airspace, for example at an airport or in the immediate vicinity of an airport. In such a case, a permissible flying area is first defined and is transmitted to the drone or flying device. The flying device is not permitted to leave such a flight corridor. The corridor is defined for example by taking into account the maximum pivot and/or rotation range of the crane plus a configurable distance addition to the pivot and/or rotation range.

The result of establishing the individual comparison of the target and current crane elements can preferably be displayed to the crane operator visually or also acoustically. A display within the crane cab is conceivable here. It is likewise particularly preferable for regular crane operation to only be enabled if it was possible to establish conformity between the target and current crane elements for all or at least the majority of said crane elements.

Of course, it may be provided that the flying device can also be manually actuated and navigated by the crane operator. In a development of the method, it may be provided that individual installation points or connection points between crane elements can also be checked in a targeted manner by means of the flying device. A classic example here is a bolt connection being properly executed, with it being intended to be established whether the bolt and optionally a potential securing pin have been inserted.

It is conceivable to manually actuate the flying device in order to detect the desired installation point or connection point by means of the integral camera and to carry out a manual check on a display element, for example in the crane operator's cab. There is also the option of the flying device autonomously actuating the installation point or connection point, but the crane operator carrying out the visual check of the installation point or connection point. To do this, the image data from the camera installed on the flying device are transmitted to a monitor in the crane cab. The required determination of the target position data for the installation point or connection point can be carried out in accordance with the method according to the invention.

As an alternative to the manual double-checking, this can also be carried out in an automated manner by means of image processing.

In addition to the method according to the invention, the present invention likewise relates to a system consisting of at least one crane and at least one mobile flying device, in particular a drone. The system is characterised in that both the crane controller and the integrated controller of the flying device are configured for carrying out the method. According to the invention, the crane controller is therefore programmed such that target positions of individual target crane elements are calculated on the basis of the input crane setup state and also any potential sensor values, and optionally by taking into account the geometric data for individual crane elements and the position data for corresponding identification features. In addition, the crane controller is suitable for communicating with an external flying device. The drone and/or the crane controller comprise corresponding software components which are suitable both for identifying individual current crane elements and for comparing detected current crane elements with stored target crane elements.

According to an advantageous configuration of the system, a landing and/or charging station for the flying device may be connected to the crane or may be an integral component of the crane structure.

Other advantages and properties of the method shall be explained in greater detail in the following with reference to an exemplary embodiment explained in the exemplary embodiments.

DETAILED DESCRIPTION

Figure 4:
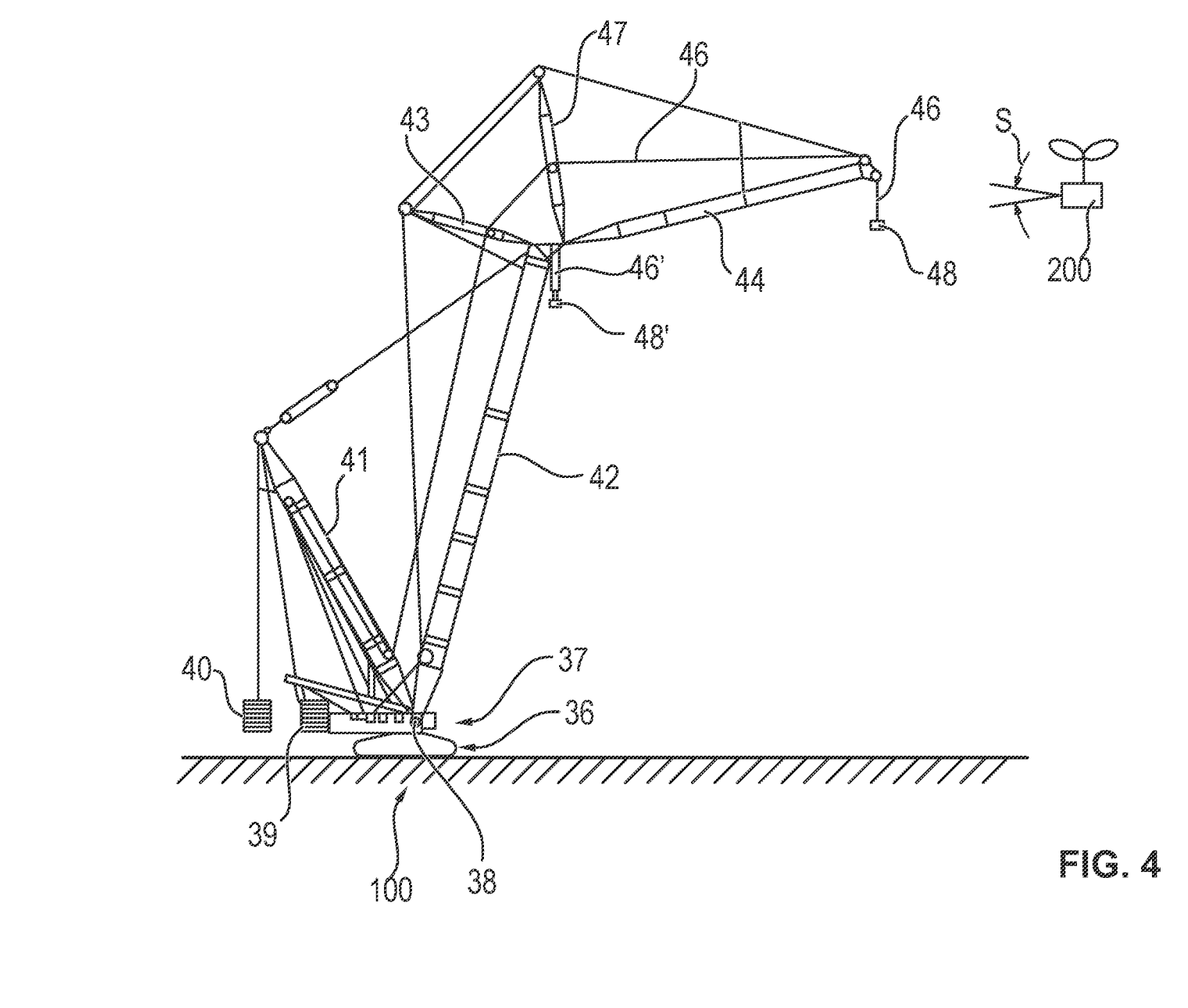
FIG. 4 is a schematic view of a crawler crane suitable for carrying out the method according to the invention.

By means of the method according to the invention for recognising a setup state, the entire setup state including the boom combination can be established, as far as possible, on the mobile lattice boom crane or telescopic crane comprising a wheeled travel gear or crawler travel gear. The crane comprises a superstructure 37 and an undercarriage 36 (FIG. 4). The solution according to the invention establishes, inter alia, whether a lattice boom or telescopic boom has been correctly mounted in terms of the length and order of the crane elements. Likewise, the correct composition of the ballast can be established.

Figure 2:
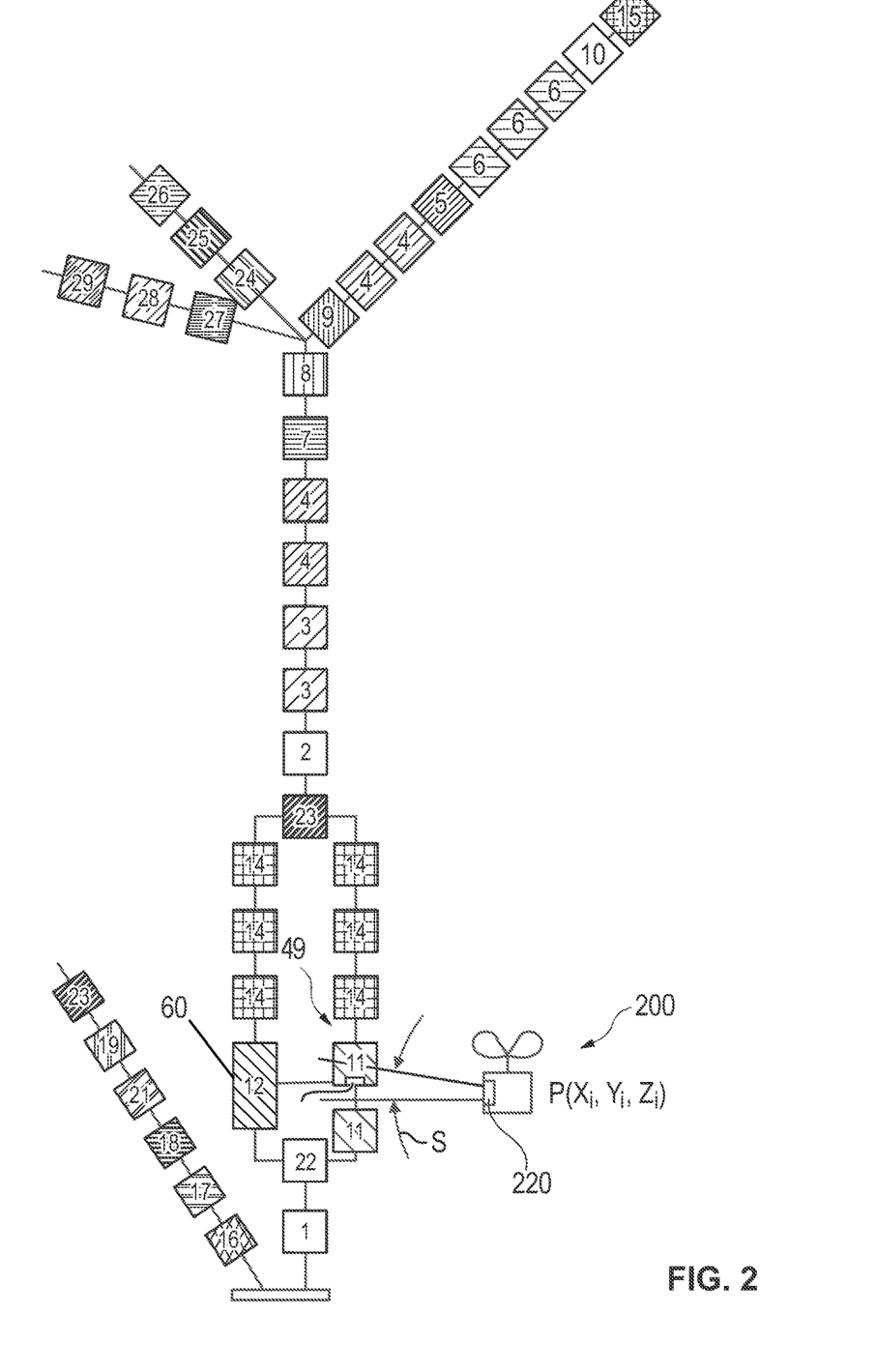
FIG. 2 is another visual description of the crane setup state for an alternative crane.

The setup state is an essential element of the overload protection on the crane. The setup state being correctly input is the basis for safely operating the crane. In the following, a rough overview of the crane elements 49 essential to the setup state are provided:

Lattice Boom 42
luffing boom, optionally fixed fly jib 44
WA frames 43, 47
Derrick boom 41
Branch part in a parallel boom, or P boom for short, as shown in FIG. 2
Junction part
Ballast element 39, 40 (superstructure ballast, derrick ballast, suspended ballast, ballast trailer, central ballast)
Reeving of the hoist cable 46 (46')
Hook block 48 (48') (weights, load hook)
Bolt 50
Bolt locking device 51.

Figure 1:
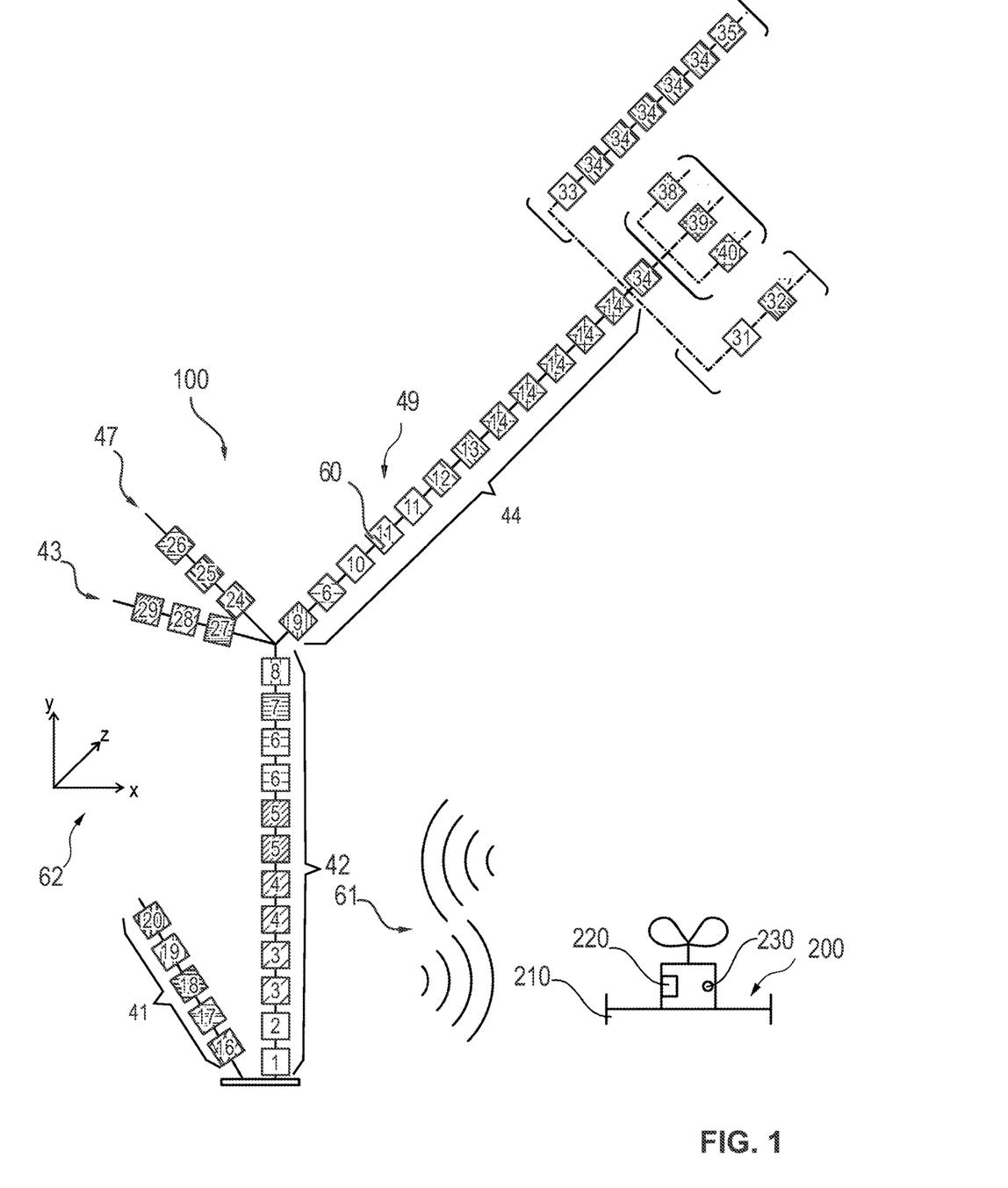
FIG. 1 is a visual description of the crane setup state for a first crane.
Figure 3:
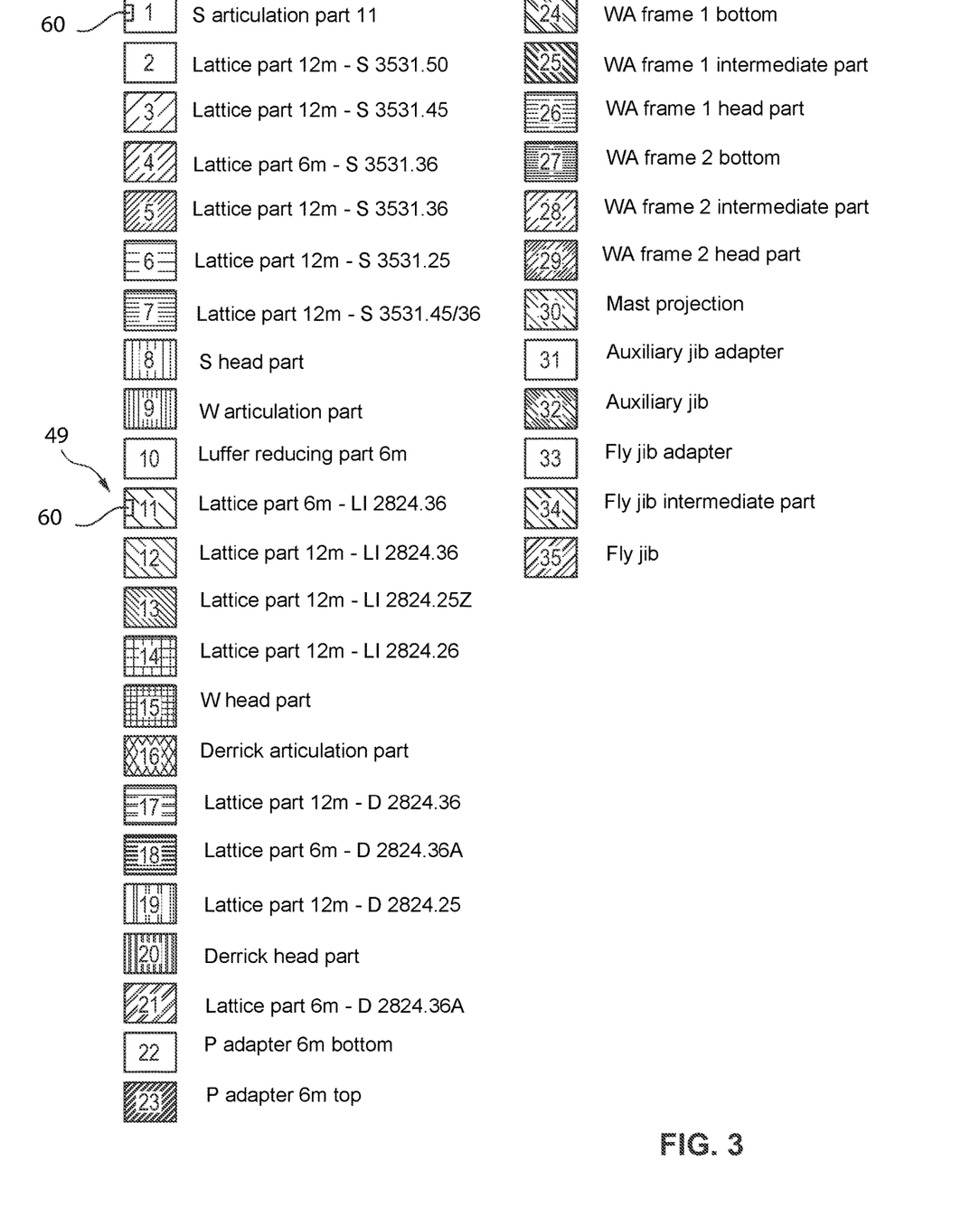
FIG. 3 shows the key for explaining the installed crane elements in FIGS. 1 and 2.

FIGS. 1 and 2 show setup state information for two cranes comprising different equipment. FIG. 1 shows a crane comprising a lattice boom 42 and a derrick boom 41. A luffing boom 44 is articulated to the lattice boom 42 for luffing. The jib of the luffing boom can be equipped in accordance with five different configurations. There are different configuration options for the structure of the jib of the luffing boom. Said figure shows the individual crane elements 49 for the boom system in the installed order. FIG. 3 lists the installed crane elements 49 with a short description. FIG. 4 schematically shows the crane with the setup information from FIG. 1.

FIG. 2 shows setup information for a similar crane which differs from the crane in FIG. 1 on account of having a parallel boom.

Figure 5:
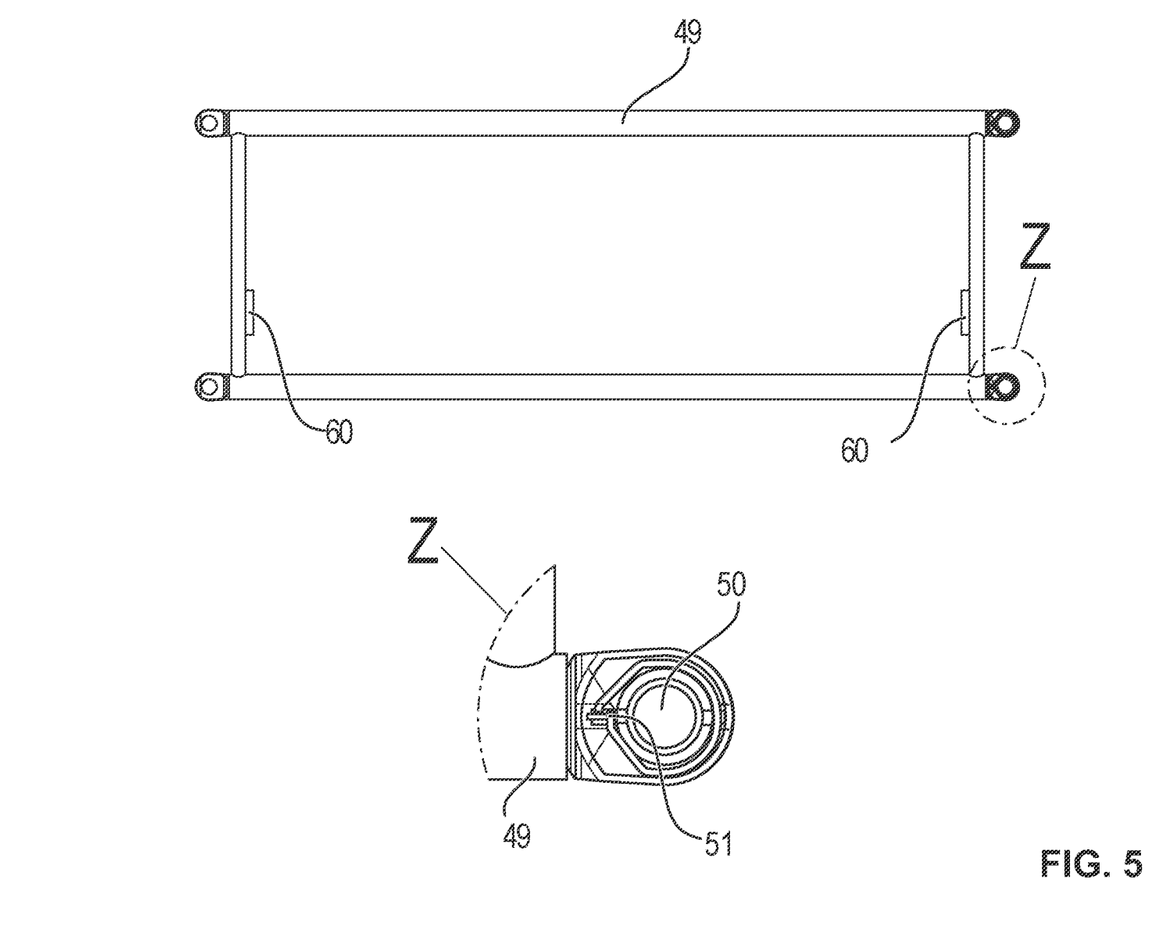
FIG. 5 shows a crane element for explaining the optional checking of the proper installation point.

For carrying out the method, the installed crane elements 49, i.e. a lattice part or a ballast element, for example, are provided with identification means 60. This takes place when producing the relevant crane element 49. The sheet-metal sign that is already known from the prior art can be used as an example of an identification means 60 of this kind. This sign is fixed to an element of the lattice part 49 (see FIG. 5). The precise position of the identification means 60 on the crane element 49 is available to the crane controller. All identification means 60 can be identified in a similar manner. Adhesive labels, transponders, barcodes, etc., can be used as alternatives to sheet-metal signs. It is not compulsory for all the crane elements 49 to be equipped with the same type of identification means 60.

According to the invention, the crane operator inputs the setup state that they have provided into the crane controller 38 of the crane 100. Said controller transmits data and the setup state to a drone 200. The data transmission 61 can be wireless. The drone 200 can be parked on a kind of docking station 210. This may also be integrated in the crane 100. The drone 200 is continuously charged in the docking station 210 and will always be ready to use. It is possible for data to be transmitted from the drone 200 back to the crane 100. Furthermore, the drone 200 comprises a system for position recognition. This may take place in the manner of a GPS system or using a GPS system. The drone 200 also comprises at least one recognition system 220 for recognising the identification means 60. This may be an optical camera in the simplest case.

If the crane operator enters the "setup state recognition" mode, the crane 100 together with all of its crane elements 49 is then moved into a defined position. This defined position does not necessarily have to be a raised boom position, as shown in FIG. 1. Said position could as well be located with the boom upright and the stays tensioned, with the boom not yet having been raised. The controller 38 calculates the expected target positions of the respective identification means 60 from the input setup state, the angular positions of the crane elements 49 that are approached, and the geometric data of the identification means 60 in the relevant crane element 49, which are stored in the controller 38, and the geometric data of the various crane elements 49, at least for one position, and preferably for all the positions, of the crane elements 49.

An in particular crane-related coordinate system 62 may be used. This coordinate system 62 may be linked to other coordinate systems, such as GPS data.

The drone 200 then receives all the necessary data from the controller 38. The drone 200 then starts up and flies to all the positions at which it is expected to be possible to identify a crane element 49. By means of the setup state, the drone 200 also knows which crane element 49 is expected to be at the position. According to the example from FIG. 2, the drone 200 flies to the position P with a defined orientation $(x_1, y_1, z_1)$. At this point, the recognition system 220 has the visible detection range S. An identification means 60 is expected in this detection range S. If an identification means 60 cannot be recognised here, there is an error that is recorded in a memory 230 by the drone 200. If an identification means 60 is recognised here, this is read out and compared with the expected target value (crane element 49 according to input setup state). The result is recorded in the memory 230. The drone 200 then processes all the tasks P $(x_1, y_1, z_1)$ and subsequently returns to its docking station 210.

The reeving of the hoist cable 46 and the check of the loaded ballast plates 39, 40, as shown in FIG. 4, can be specially mentioned as crane elements 49 that determine the setup state. The results are transmitted to the controller 38 of the crane 100 and are further processed thereby. This processing could constitute information regarding whether the actual setup state corresponds to the expected setup state. If this is the case, the crane 100 is enabled for crane work.

It would also be conceivable for the crane operator to be able to influence or fully control the drone 200 by means of a remote control. Another possible object is to confirm the complete and correct mounting of the various crane elements 49. Selected and essential connection points can thus be checked for correct connection. This is carried out, for example, by means of image recognition and/or by transmitting the recorded image from the drone 200 into the crane cab to the crane operator. They can thus assess whether the bolt 50 (see FIG. 5), which connects two crane elements 49 in the form of lattice parts, is correctly inserted and whether the bolt locking device 51 is correctly attached. All the other essential mounting results can also be checked in this way.

An essential advantage of the method is the option for checking when the crane is in an upright position. After the checking, the crane is immediately ready to use and a change to the setup state would be an essential influence on the workflow. Unintended, incorrect execution is associated with complexity and costs, and therefore this is as good as eliminated. It is also advantageous that the drone 200 operates at height. This reduces the risk of uninvolved crane elements 49 that are not connected to the crane 100 being detected. The safety of application is further increased.

It should also be mentioned that it is unimportant whether the essential calculation work is carried out in the controller 38 or by a computer in the drone 200. The drone 200 could thus also have a certain "level of intelligence". Calculation by means of "cloud computing" would also be conceivable. If the identification means 60 are suitably configured, the identification can be performed even in difficult conditions. Difficult conditions may be darkness, fog, critical temperatures, precipitation or snowfall. Ice, snow or corrosion on the crane element 49 may likewise present difficulties, which can, however, be circumvented by suitably configuring the identification means, for example configuring the identification means as a transponder.

The drone 200 itself has collision recognition. Furthermore, for safety reasons and for use at certain locations, e.g. airports, the flying area of the drone could be restricted. It would thus be conceivable for this to be restricted to the pivot and rotation range of the boom system of the crane 100 with a necessary distance addition. A LOG file could also be created by the drone 200. In this LOG file, all the confirmations could be recorded. The correct setup state of the crane would thus always be comprehensible. The crane operator receives confirmation or feedback regarding whether the crane 100 has been set up according to the specifications. In this case, the selected load table for overload protection corresponds to the setup state provided.

The invention claimed is:

1. A method for recognising a setup state of a crane in which the crane setup state input manually into a crane controller is compared with the actual current setup state, comprising the steps of:
    determining a target position of at least one target crane element installed on the crane via a crane setup state stored in the crane controller and at least one crane sensor value,
    transmitting the one or more pieces of target position data to a mobile flying device,
    moving the flying device into a region in an immediate vicinity of the target position of the target crane element and detecting and identifying a current crane element located there using a detection means, and
    identifying the current crane element detected in the detection region and establishing whether the detected crane element corresponds to the target crane element,
    wherein the target position is defined in a crane-related coordinate system and the crane-related coordinate system is linked to at least one additional coordinate system, and
    wherein the flying area of the flying device is restricted to a permissible, definable flying area, and the flying area is restricted to a pivot and/or rotation range of the crane plus a configurable distance addition.

2. The method according to claim 1, wherein an optical camera is used as the detection means.

3. The method according to claim 1, wherein one or more crane elements are equipped with an identification means, and in that the detected current crane element is identified by evaluating the identification information provided by the identification means.

4. The method according to claim 3, wherein geometric data of the target crane element and/or position information for the identification means on the target crane element are additionally taken into account when determining the target position of the target crane element.

5. The method according to claim 1, wherein the identification means is an adhesive label applied to the crane element and/or an applied barcode and/or a transponder.

6. The method according to claim 1, wherein the crane is moved into a defined state prior to determining the target position.

7. The method according to claim 6, wherein the crane is moved into the state with the boom upright.

8. The method according to claim 1, wherein the steps of identifying the current crane element and/or establishing conformity between the target and current crane element are performed by the crane controller and/or a controller of a flying device and/or in a cloud-based manner.

9. The method according to claim 8, wherein the result of the establishing is visually or optically displayed to a crane operator.

10. The method according to claim 8, wherein the crane controller enables the crane operation when conformity between the target and current crane elements has been established.

11. The method according to claim 1, wherein the geographical coordinates are ascertained by an integral positioning system of the flying device.

12. The method according to claim 11, wherein the integral positioning system is a GPS system.

13. A method for recognising a setup state of a crane in which the crane setup state input manually into a crane controller is compared with the actual current setup state, comprising the steps of:
    determining a target position of at least one target crane element installed on the crane via a crane setup state stored in the crane controller and at least one crane sensor value,
    transmitting the one or more pieces of target position data to a mobile flying device,
    moving the flying device into a region in an immediate vicinity of the target position of the target crane element and detecting and identifying a current crane element located there using a detection means, and
    identifying the current crane element detected in the detection region and establishing whether the detected crane element corresponds to the target crane element,
    wherein the target position is defined in a crane-related coordinate system and the crane-related coordinate system is linked to at least one additional coordinate system, and wherein the flying device is additionally used to check that a crane element is properly mounted on the crane structure by a visual detection range of an installation point being evaluated by image recognition and/or being transmitted to a display element, for manual evaluation.

14. A method for recognising a setup state of a crane in which the crane setup state input manually into a crane controller is compared with the actual current setup state, comprising the steps of:

determining a target position of at least one target crane element installed on the crane via a crane setup state stored in the crane controller and at least one crane sensor value, transmitting the one or more pieces of target position data to a mobile flying device, moving the flying device into a region in an immediate vicinity of the target position of the target crane element and detecting and identifying a current crane element located there using a detection means, and identifying the current crane element detected in the detection region and establishing whether the detected crane element corresponds to the target crane element, wherein the target position is defined in a crane-related coordinate system and the crane-related coordinate system is linked to at least one additional coordinate system, and wherein the flying device is additionally used to check that a crane element is properly mounted on the crane structure by a visual detection range of an installation point being evaluated by image recognition and/or being transmitted to a display element, for manual evaluation, and wherein the display element is within a crane cab.

* * * * *